UNITED STATES PATENT OFFICE.

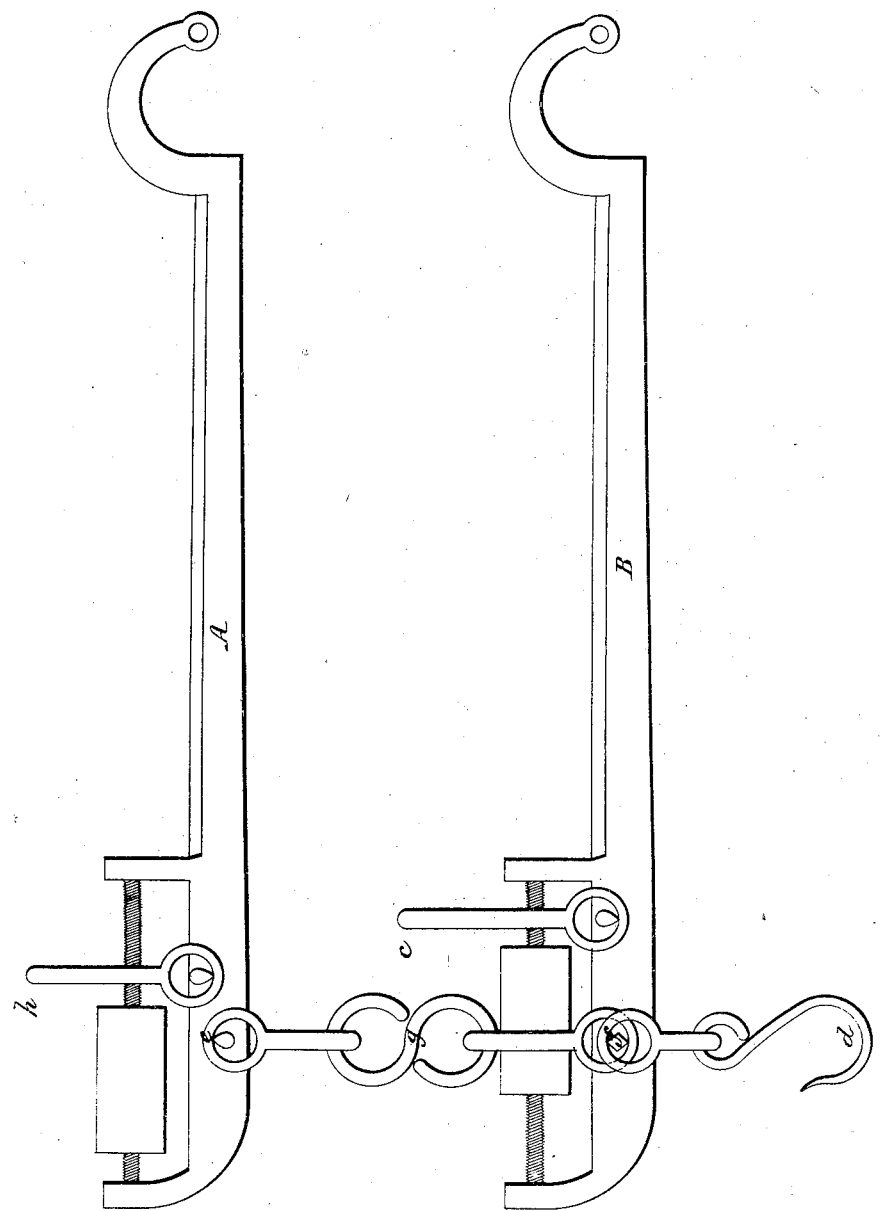

SAMUEL T. McDOUGALL, OF NEW YORK, N. Y.

SCALE-BEAM.

Specification of Letters Patent No. 7,122, dated February 26, 1850.

*To all whom it may concern:*

Be it known that I, SAMUEL T. MC-DOUGALL, of the city, county, and State of New York, have invented a new Improvement in Scale-Beams; and I do hereby declare the following to be a full, clear, and exact description of the same, reference being had to the annexed drawings, making a part of this specification, which are fully referred to herein by letters.

The nature of my improvement consists in a combination of two or more scale beams or steelyards in order that one of them the weight in "units" and "tens" may be indicated, on another the "hundreds" and on a third if necessary the "thousands." I am aware that this has already been accomplished by coupling beams at the ends, or that part farthest at the fulcrum; but that method does not allow of sufficient sensitiveness in the scales to admit of the requisite accuracy since the heavy weight used to counterbalance produce too much friction at the fulcrum or bearing point of the lower beam. In my scale beams the points of suspension are increased in number, consequently the friction is less being divided between two or more fulcra and I am thus enabled to secure a degree of sensitiveness hitherto unattained in scales for weighing heavy masses.

I construct my apparatus by using two or more scale beams of the ordinary construction known as "steelyards" and each of these I suspend from a fixed point, wholly undependent of that of the other beam. In the annexed drawing the point of suspension of the beam A is shown at $(h)$ and that of the beam B at $(c)$. The material to be weighed is attached at $(d)$. The beam A is connected with the beam B by attaching that point $(e)$ on the beam A to which a subject to be weighed is usually affixed, to the corresponding point $(f)$ on the beam B and this I do by any convenient link as $(g)$. The operation of weighing is thus performed simultaneously on each and is as follows. A material to be weighed is attached at $(d)$ and a weight applied to balance it on the beam B; if the length of lever is found insufficient a weight on the beam A is moved out one grade and a new attempt made to balance on the beam B; if this be now successful the indications on A will be of certain fixed numbers, while those on B will be of the fractional parts of those on A.

I do not intend to limit myself to the precise forms herein described, but vary the same to suit circumstances while I attain the results before named by these means.

What I claim as of my own invention and desire to secure by Letters Patent is—

The combination of two or more scale beams (having fixed and independent points of suspension) with each other at the points $(e)$ and $(f)$, where the weight is usually attached substantially in the manner and for the purpose herein set forth.

S. T. McDOUGALL.

Witnesses:
S. H. MAYNARD,
T. H. WOOD.